(12) United States Patent
Yeke Yazdandoost et al.

(10) Patent No.: US 10,509,940 B2
(45) Date of Patent: Dec. 17, 2019

(54) ELECTRONIC DEVICE INCLUDING SEQUENTIAL OPERATION OF LIGHT SOURCE SUBSETS WHILE ACQUIRING BIOMETRIC IMAGE DATA AND RELATED METHODS

(71) Applicant: Apple Inc., Cupertino, CA (US)

(72) Inventors: Mohammad Yeke Yazdandoost, San Jose, CA (US); Giovanni Gozzini, Berkeley, CA (US); Dale R. Setlak, Merritt Island, FL (US)

(73) Assignee: APPLE INC., Cupertino, CA (US)

( * ) Notice: Subject to any disclaimer, the term of this patent is extended or adjusted under 35 U.S.C. 154(b) by 184 days.

(21) Appl. No.: 15/718,828

(22) Filed: Sep. 28, 2017

(65) Prior Publication Data

US 2019/0095671 A1   Mar. 28, 2019

(51) Int. Cl.
*G06K 9/00* (2006.01)
*G06K 9/20* (2006.01)

(52) U.S. Cl.
CPC ......... *G06K 9/0004* (2013.01); *G06K 9/2027* (2013.01); *G06K 9/2036* (2013.01)

(58) Field of Classification Search
CPC ... G06K 9/0004; G06K 9/2027; G06K 9/2036
See application file for complete search history.

(56) References Cited

U.S. PATENT DOCUMENTS

| | | | | |
|---|---|---|---|---|
| 7,735,729 | B2* | 6/2010 | Rowe | A61B 5/1171 235/382 |
| 2016/0041663 | A1* | 2/2016 | Chen | G06F 3/0412 345/174 |
| 2016/0098614 | A1* | 4/2016 | Yamanashi | G06K 9/4661 348/135 |
| 2016/0266695 | A1* | 9/2016 | Bae | G06F 1/1643 |
| 2016/0283772 | A1* | 9/2016 | Nelson | G06F 3/0421 |
| 2017/0220844 | A1* | 8/2017 | Jones | G06K 9/0053 |
| 2018/0012069 | A1* | 1/2018 | Chung | A61B 5/1172 |
| 2018/0196985 | A1* | 7/2018 | Ling | G06K 9/0004 |
| 2019/0026522 | A1* | 1/2019 | Wang | G06K 9/0004 |

OTHER PUBLICATIONS

Yeke Yazdandoost et al., U.S. Appl. No. 15/718,887, filed Sep. 28, 2017.

* cited by examiner

*Primary Examiner* — Utpal D Shah
(74) *Attorney, Agent, or Firm* — Allen, Dyer, Doppelt, + Gilchrist, P.A.

(57) ABSTRACT

An electronic device may include a dielectric cover layer defining a finger sensing surface and at least one optical image sensor below the dielectric cover layer. The electronic device may also include at least one optical element associated with the at least one optical image sensor. Light sources may be below the dielectric layer and may be selectively operable in subsets of light sources. A controller may be configured to sequentially operate respective adjacent subsets of light sources while acquiring biometric image data from the at least one optical image sensor.

27 Claims, 17 Drawing Sheets

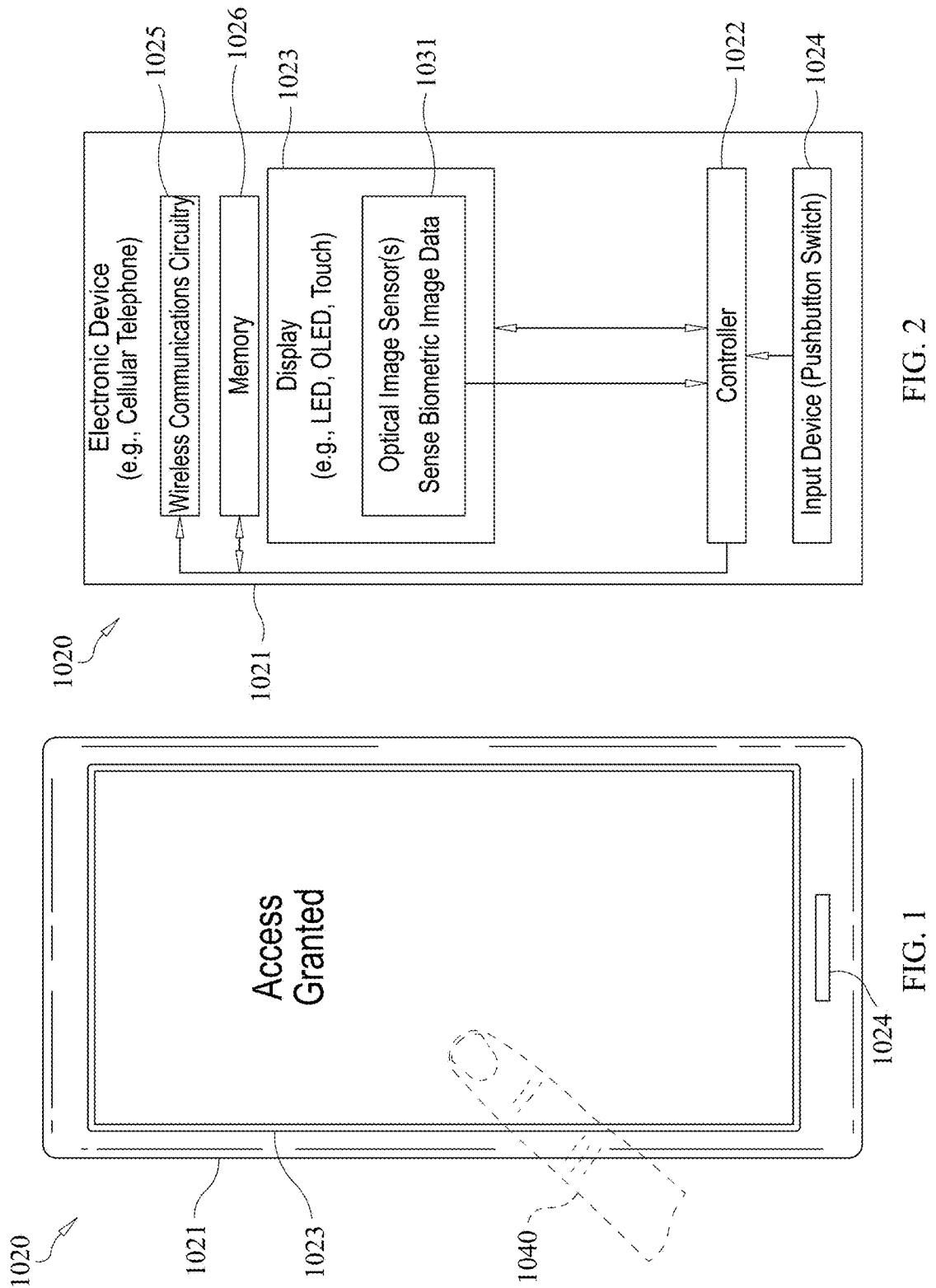

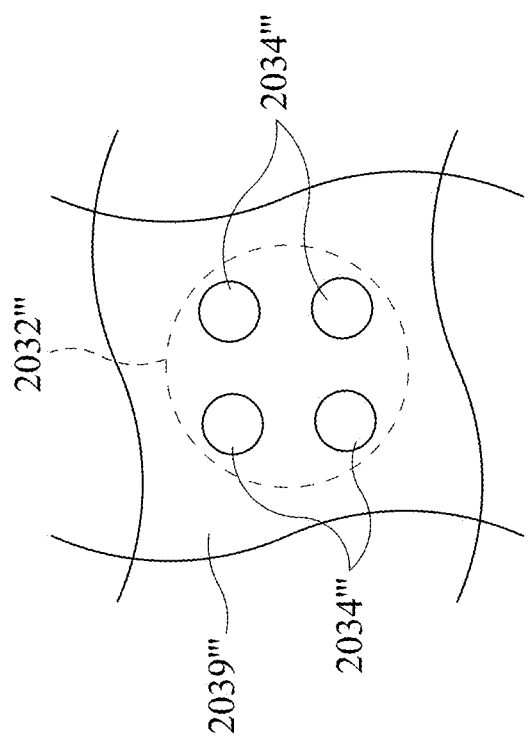

ELECTRONIC DEVICE INCLUDING SEQUENTIAL OPERATION OF LIGHT SOURCE SUBSETS WHILE ACQUIRING BIOMETRIC IMAGE DATA AND RELATED METHODS

TECHNICAL FIELD

The present invention relates to the field of electronics, and, more particularly, to the field of optical image sensors and related methods.

BACKGROUND

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A fingerprint sensor may be particularly advantageous for verification and/or authentication in an electronic device, and more particularly, a portable device, for example. Such a fingerprint sensor may be carried by the housing of a portable electronic device, for example, and may be sized to sense a fingerprint from a single-finger.

Where a fingerprint sensor is integrated into an electronic device or host device, for example, as noted above, it may be desirable to more quickly perform authentication. Authentication may be delayed by other tasks or applications being performed on the electronic device, or by electronic device background processes.

SUMMARY

An electronic device may include a dielectric cover layer defining a finger sensing surface and at least one optical image sensor below the dielectric cover layer. The electronic device may also include at least one optical element associated with the at least one optical image sensor and a plurality of light sources below the dielectric cover layer. A controller may be configured to sequentially operate respective adjacent subsets of light sources while acquiring biometric image data from the at least one optical image sensor.

The at least one optical element may include at least one pin-hole mask, for example. The at least one optical element may include at least one microlens, for example.

The plurality of light sources may include a plurality of dedicated illumination pixels. The plurality of light sources may include a plurality of display pixels, for example.

The controller may be configured to sequentially operate respective adjacent subsets of light sources in a first pass in a first direction, and in a second pass in a second direction transverse to the first direction. The first and second directions may be perpendicular, for example.

The controller may be configured to acquire the biometric image data as a respective biometric image associated with each operation of the subsets of light sources. The controller may be configured to sequentially operate respective adjacent subsets of light sources so that each subset of light sources has a same shape, for example.

The controller may be configured to sequentially operate respective adjacent subsets of light sources so that at least one subset of pixels has a different shape than a shape of at least one other subset of light sources. The controller may be configured to select the different shapes based upon the biometric image data, for example. The plurality of light sources may include a plurality of light emitting diodes (LEDs), for example.

A method aspect is directed to a method of acquiring biometric image data in an electronic device that includes a dielectric cover layer defining a finger sensing surface, at least one optical image sensor below the dielectric cover layer, at least one optical element associated with the at least one optical image sensor, and a plurality of light sources below the dielectric cover layer and selectively operable in subsets of light sources. The method may include using a controller to sequentially operate respective adjacent subsets of light sources while acquiring the biometric image data from the optical image sensor.

BRIEF DESCRIPTION OF THE DRAWINGS

FIG. 1 is a plan view of an electronic device according to an embodiment.

FIG. 2 is a schematic block diagram of the electronic device of FIG. 1.

FIG. 18 is a schematic diagram of a portion of an optical image sensor in accordance with another embodiment.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation and numbers in increments of 1000 are used to indicate similar elements in alternative embodiments.

Figure 3:
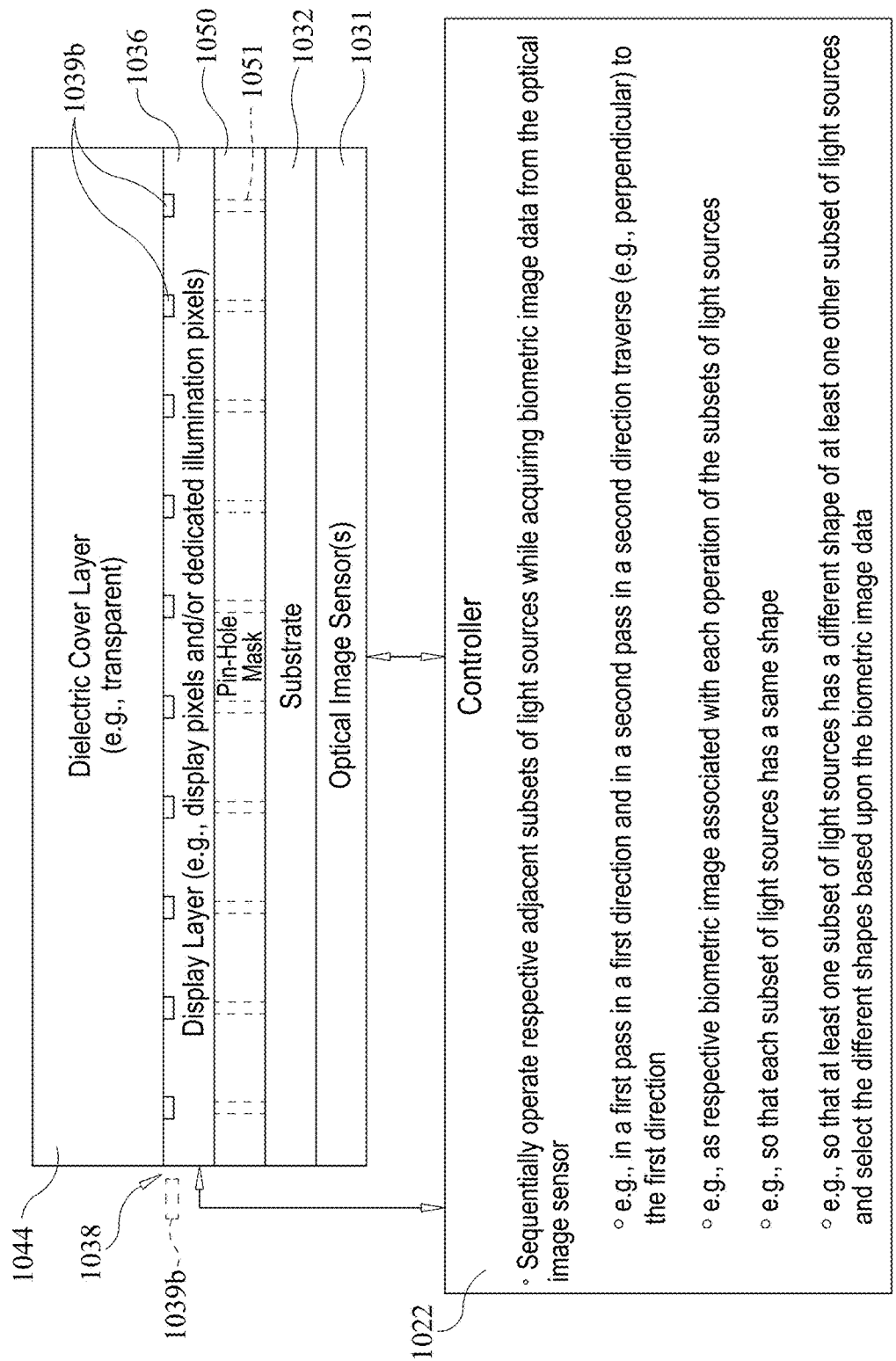
FIG. 3 is a more detailed schematic block diagram of a portion of the electronic device of FIG. 2.

Referring initially to FIGS. 1-3 an electronic device 1020 illustratively includes a housing, for example, a portable housing 1021, and a controller 1022 carried by the portable housing. The electronic device 1020 is illustratively a mobile wireless communications device, for example, a cellular telephone. The electronic device 1020 may be another type of electronic device, for example, a tablet computer, laptop computer, wearable computer, etc.

A display 1023 is also carried by the portable housing 1021 and is coupled to the controller 1022. The display 1023 may be a light emitting diode (LED) display, for example, and may have additional circuitry to provide touch display features, as will be appreciated by those skilled in the art. Further details of the display 1023 are described below.

The wireless communications circuitry 1025 is also carried within the housing 1021 and coupled to the controller 1022. The wireless communications circuitry 1025 cooperates with the controller 1022 to perform at least one wireless communications function, for example, for voice and/or data. In some embodiments, the electronic device 1020 may not include a wireless transceiver 1025 or other wireless communications circuitry.

A memory 1026 is also coupled to the controller 1022. The memory 1026 is for storing biometric template data, for example. The memory 1026 may store other or additional types of data.

As will be appreciated by those skilled in the art, if the display 1023 is in the form of a touch display, the touch display may operate as both an input device and a display. As such, the display 1023 would cooperate with the controller 1022 to perform one or more device functions in response to input. For example, a device function may include a powering on or off of the electronic device 1020, initiating communication via the wireless transceiver 1025, and/or performing a menu function based upon input to the touch display.

The controller 1022 may change the display 1023 to show a menu of available applications based upon pressing or input to the touch display. Of course, other device functions may be performed based upon input to the touch display 1023. Other or additional finger-operated user input devices may be carried by the portable housing 1021, for example, a pushbutton switch 1024, which may alternatively or additionally be used for device functions as will be appreciated by those skilled in the art.

An optical image sensor 1031 is carried by the housing 1021 under the display 1023. The optical image sensor senses biometric image data associated with a user, such as, for example, data representative of a biometric image of the fingerprint patterns of the user's finger 1040. The controller 1022 may perform an authentication function by matching the acquired biometric image data to the stored biometric template data stored in the memory 1026, for example. The controller 1022 may perform and/or restrict functionality of the electronic device 1020 based upon the authentication as will be appreciated by those skilled in the art. In some embodiments, there may be more than one optical image sensor 1031.

An optical element illustratively in the form of a pin-hole mask 1050 is associated with the optical image sensor 1031, for example, spaced from the optical image sensor by a substrate 1032. While a pin-hole mask is described in the present embodiment, as will be appreciated by those skilled in the art, and described in further detail below, the optical element 1050 may be another type of optical element and configured differently with the optical image sensor 1031 and other elements (e.g., co-planar).

The pin-hole mask 1050 may be an opaque mask and has a plurality of spaced apart openings 1051 or pin-holes therein to permit the passage of light therethrough. The pin-hole mask 1050 is opaque, and thus does not permit light to pass through. The pin-hole mask 1050 may include chromium, for example, a layer of chromium, to provide the opacity. Of course, other materials, may be used to provide opacity.

Light sources 1038 are carried by or within a display layer 1036, which may be part of the display 1023. The pixel display layer 1036 is above the pin-hole mask 1050. The light sources 1038 may be in the form of pixels, for example, display pixels 1039*a* arranged in an array and spaced apart for displaying images. In particular, the pixel display layer 1036 may be part of a light-emitting diode (LED) display and include LEDs, for example, organic LEDs (OLEDs). The space between the display pixels 1039*a* may be aligned with the openings 1051 or pin-holes. It should be appreciated by those skilled in the art that the pin-hole mask 1050 may be part of the display 1023 along with the pixel display layer 1036. In some embodiments, the light sources 1038 may be dedicated illumination pixels 1039*b* that may not be display pixels, but instead be dedicated to illumination for the optical image sensor 1031 (i.e., a separate or external light source). Of course, the pixels 1038 may include a combination of display pixels 1039*a* and dedicated illumination pixels 1039*b*.

A dielectric cover layer 1044 is over the pixel display layer 1036. The dielectric cover layer 1044 may be optically transparent and has an upper surface that defines a finger placement or sensing surface to receive the user's finger 1040 adjacent thereto.

Figure 4:
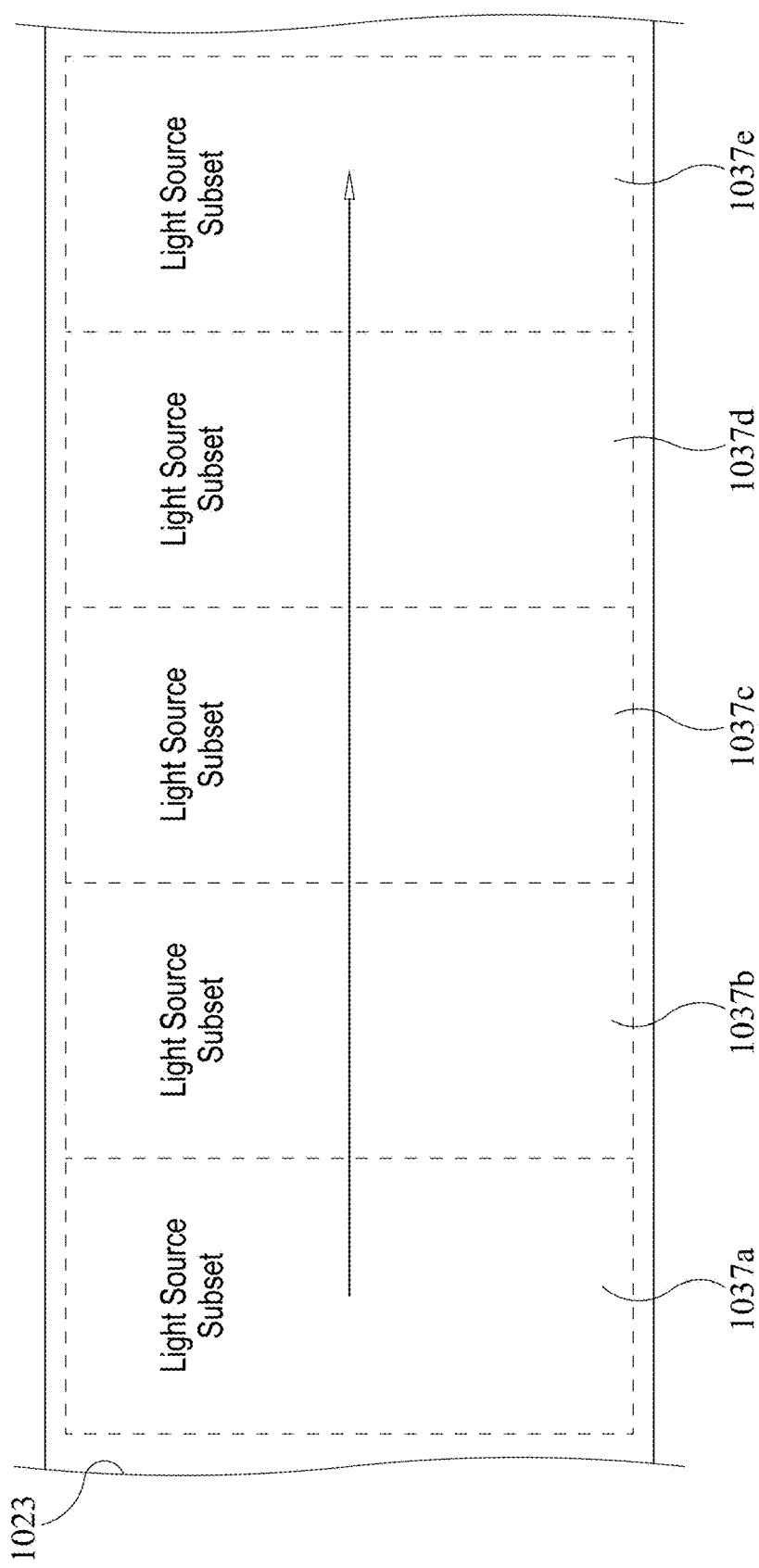
FIG. 4 is a diagram illustrating sequential operation of adjacent subsets of pixels according to an embodiment.

Further details of the operation of the controller with respect to the light sources 1038 will now be described. As will be appreciated by those skilled in the art, to obtain or extract relevant information from acquired biometric image data, for example, three-dimensional graphic information from the user's finger 1040, illumination patterns may be used. Different illumination patterns may focus or highlight certain features of the user's finger 1040 from the acquired biometric image data. Accordingly, referring to FIG. 4, the controller 1022 sequentially operates respective adjacent subsets of light sources 1037*a*-1037*e* while acquiring biometric image data from the optical image sensor 1031 (FIG. 4). The controller 1022 may acquire the biometric image data as a respective biometric image associated with each operation of the adjacent subsets of light sources 1037*a*-1037*e*. In other words, the controller 1022 may acquire biometric images, for example, of the user's finger 1040 during each step or iteration of the sequence. It should be noted that adjacent subsets may not be abutting, and, in some embodiments, the subsets may not be adjacent. Still further, adjacent subsets may include common, shared, or overlapping light sources.

Figure 5:
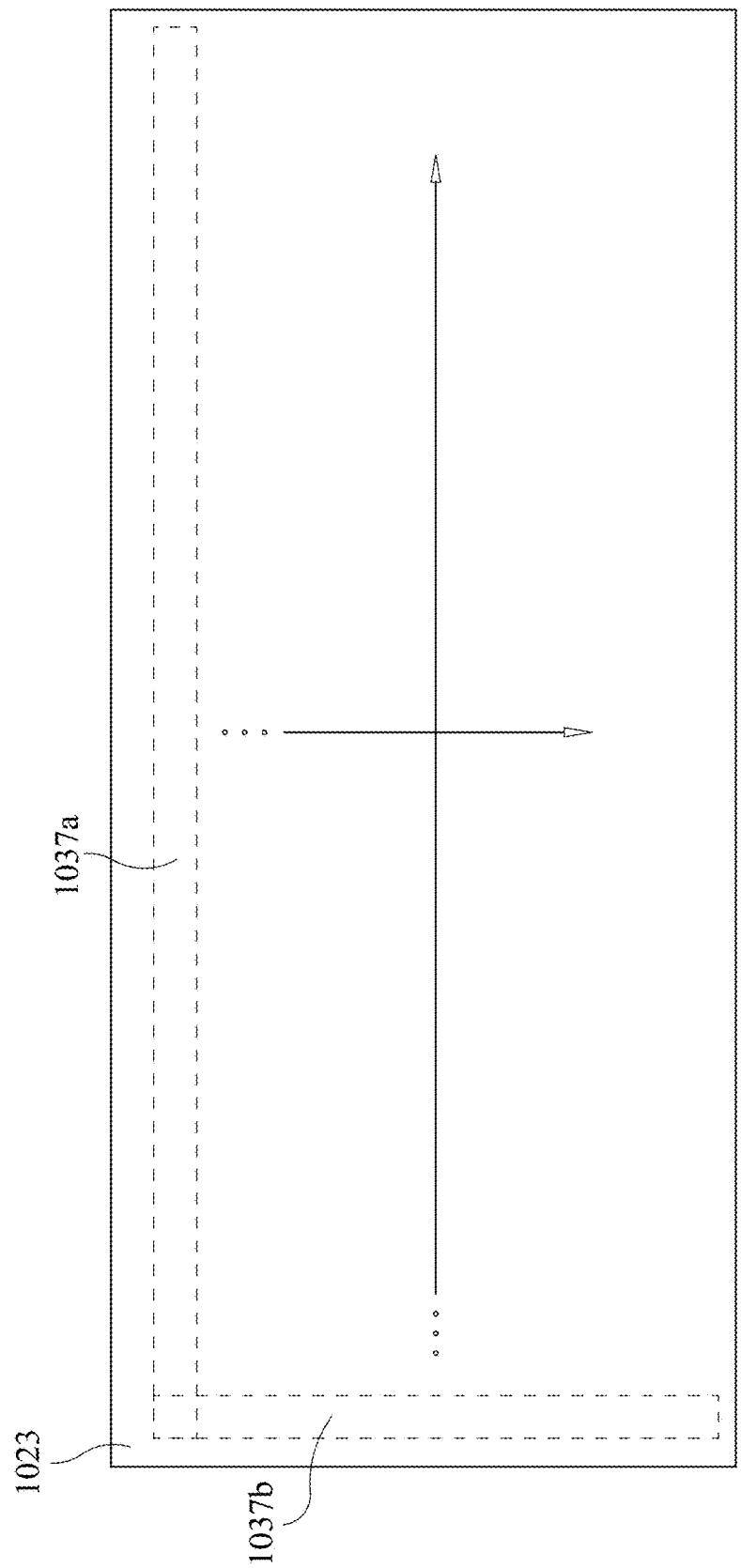
FIG. 5 is another diagram illustrating sequential operation of adjacent subsets of pixels according to an embodiment.

Referring additionally to FIG. 5, the controller 1022 may sequentially operate respective adjacent subsets of light sources 1037*a* in a first pass in a first direction and respective adjacent subsets of light sources 1037*b* in a second pass in a second direction transverse, for example, perpendicular to the first direction. In other words, for example, if the light sources 1038 are arranged in an array or rows and columns, and each subset of light sources has a rectangular shape, the controller 1022 may operate the respective adjacent subsets of light sources from a first row to a last row and then from a first column to a last column.

The controller 1022 may also sequentially operate respective adjacent subsets of light sources 1038 so that each subset of light sources has a same shape. More particularly, with respect to the example above, if a subset of light sources in a first iteration of the sequence has a rectangular shape, then the remaining iterations in the sequence or pass also have the same rectangular shape.

In other embodiments, the controller 1022 may sequentially operate respective adjacent subsets of light sources so that at least one subset of light sources 1038 has a different shape than a shape of at least one other subset of pixels. For example, if a subset of light sources in a first iteration of the sequence has a specific rectangular shape, then one or more of the remaining iterations in the sequence or pass may have a different shape. The different shapes may be selected by the controller 1022 based upon the biometric image data. For example, the shape of the subset of light sources 1038 for a current iteration in the sequence may be based upon the biometric image data acquired during a previous iteration. Accordingly, the illumination pattern may be considered dynamic.

Figure 6:
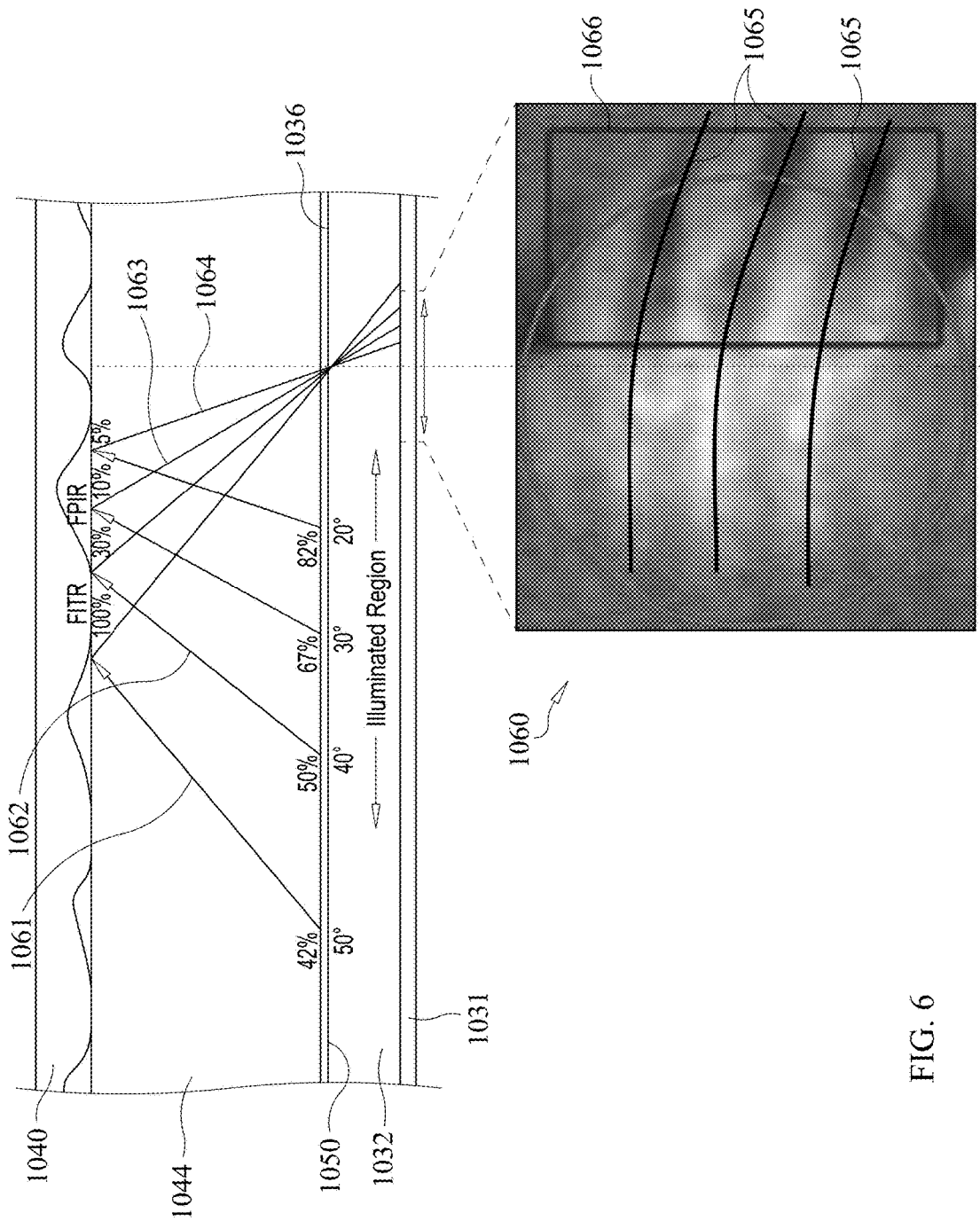
FIG. 6 is a schematic diagram illustrating acquisition of biometric image data and a corresponding image according to the embodiment in FIG. 3.

Referring now additionally to FIG. 6, as will be appreciated by those skilled in the art, patterned illumination (i.e., operation of subsets of light sources 1037a-1037e in shapes) may be particularly advantageous for acquiring three-dimensional geometric information from the images of a fingerprint. Illustratively, controlled directional illumination may permit the separation of different types of reflections into the different regions of selected acquired biometric image data. For example, the lines 1061 and 1062 (each associated with operation of a different subset of light sources 1037a-1037e) correspond to frustrated total internal reflection (FTIR), while the lines 1063 and 1064 (each also associated with operation of a different subset of pixels 1037a-1037e) correspond to frustrated partial internal reflection (FPIR). Some pin-hole based optical image sensing systems may use only data from the FPIR region of the respective biometric images. A respective biometric image 1060 is based upon acquired biometric image data acquired through a single pin-hole. The lines 1065 are illustrative of ridge contours. The region 1066 corresponds to a region of pin-hole images used to generate current FPIR images.

Figure 7:
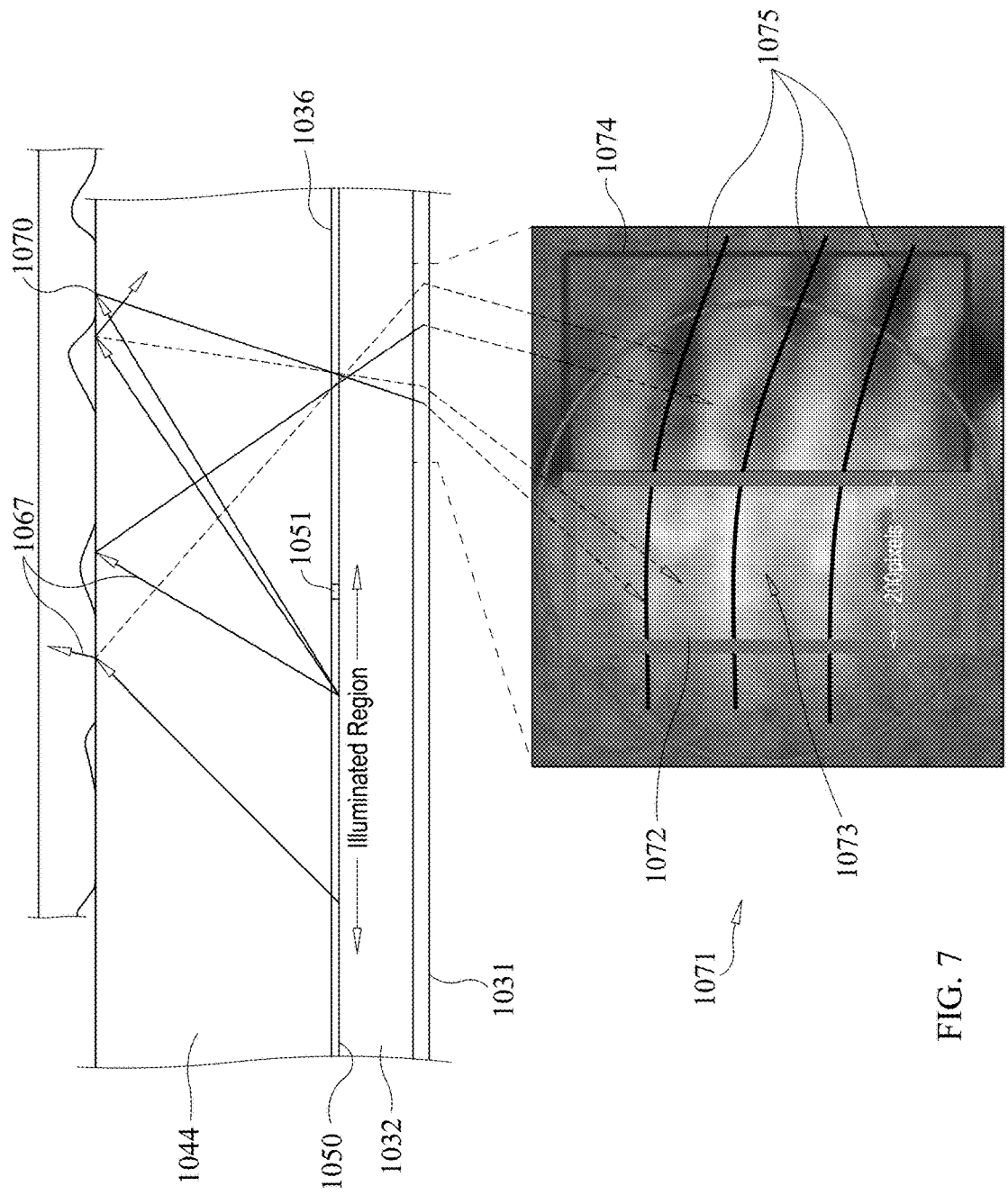
FIG. 7 is another schematic diagram illustrating acquisition of biometric image data and a corresponding image according to the embodiment in FIG. 3.

Referring now to FIG. 7, illumination parallel to the ridge direction is illustrated. It should be noted that the ridge pattern shown by the user's finger 1040 is rotated 90-degrees for purposes of illustration. The region 1067 corresponds to the cover-to-air specular reflection and the region 1070 corresponds to the ridge top diffuse reflection. A corresponding respective biometric image 1071 based upon acquired biometric image data acquired through a single pin-hole with illumination parallel to the ridge direction is illustrated. The region 1072 corresponds to the diffuse ridge top reflection data, while the line 1073 shows that the ridge image has an inverted gray scale polarity. The region 1074 corresponds to the cover layer-to-air FPIR data and the lines 1075 correspond to the ridge top contours.

Figure 8:
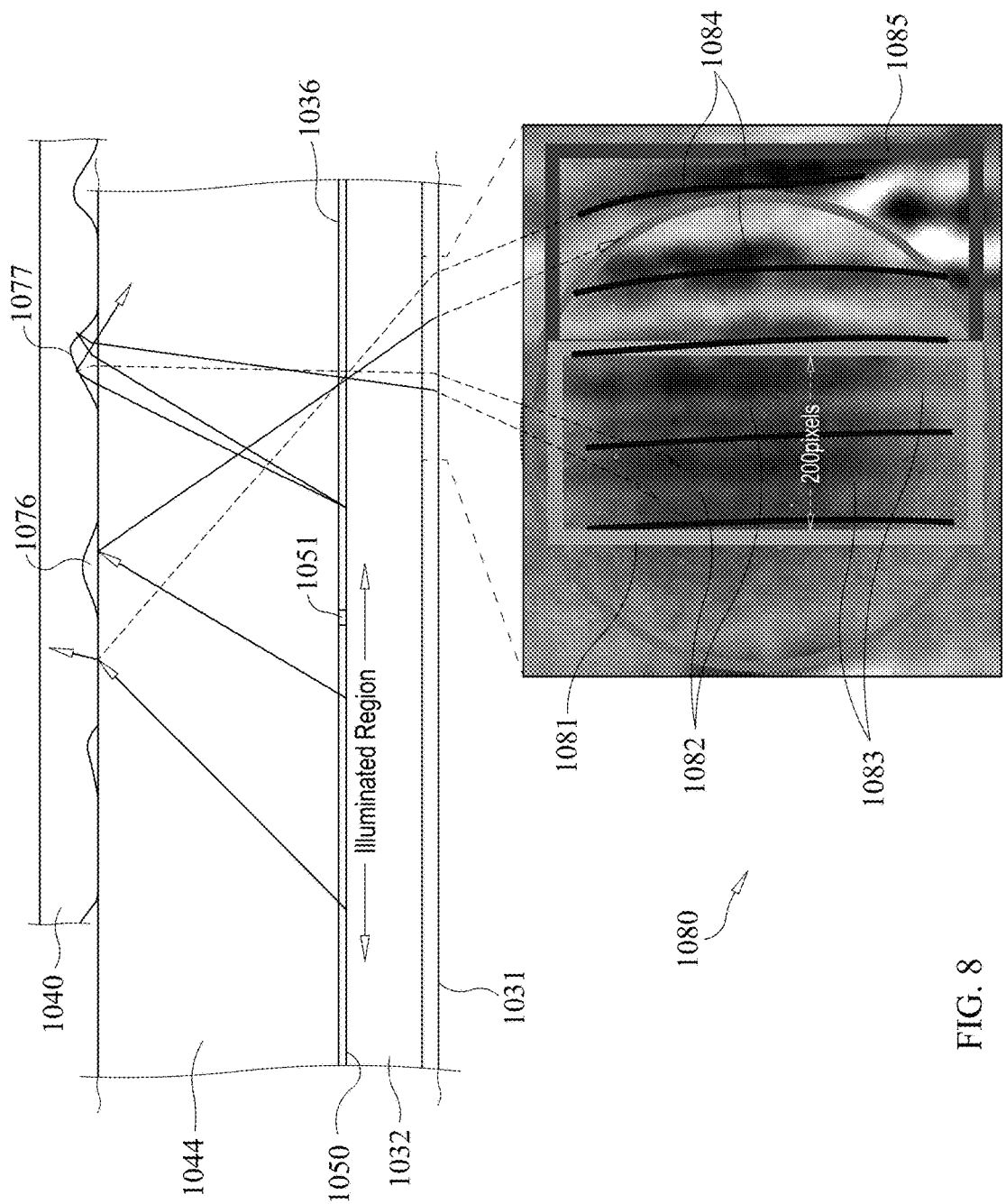
FIG. 8 is another schematic diagram illustrating acquisition of biometric image data and a corresponding image according to the embodiment in FIG. 3.

Referring now to FIG. 8, illumination perpendicular to the ridge direction is illustrated. The region 1076 corresponds to the cover-to-air specular reflection and the region 1077 corresponds to the valley wall reflection. A corresponding respective biometric image 1080 based upon acquired biometric image data acquired through a single pin-hole with illumination perpendicular to the ridge direction is illustrated. The region 1081 shows reflections and shadows from valley wall data, while the narrow brighter regions 1082 show specular reflections from the valley walls. The very dark regions 1083 show the valley walls in the shadow. The lines 1084 correspond to ridge top contours, and the region 1085 corresponds to the cover layer-to-air FPIR data.

The table below illustrates the relative benefits of using the various types of reflection data:

TABLE 1

| Fundamental Property | Effect | Cover layer-to-air specular reflection | Diffuse ridge top reflections | Valley wall reflections and shadows |
|---|---|---|---|---|
| Ridge/valley contrast | Contrast | Strongest | Weakest | Intermediate |
| Optically effective finger to cover layer contact | Contact required | Yes | Yes | No |
| | Dry finger performance | Poor | Poor | Better |
| | Effect of typical skin settling onto the glass | slow response inconsistent image depends on timing | slow response inconsistent image depends on timing | reduced imaging latency more consistent image |
| 3D shape information of fingerprint | 3D Information | No | No | Yes |
| | Effect of finger pressure variation | Fingerprint pattern varies with pressure hampering high resolution matching | Fingerprint pattern varies with pressure hampering high resolution matching | Fingerprint pattern least sensitive to pressure allowing high resolution matching |
| | Can distinguish latent fingerprint patterns from real fingers | No | No | Yes |
| | Can distinguish 2D spoofs from real fingers | No | Some if combined with glass-to-air data | Yes |

Figure 9:
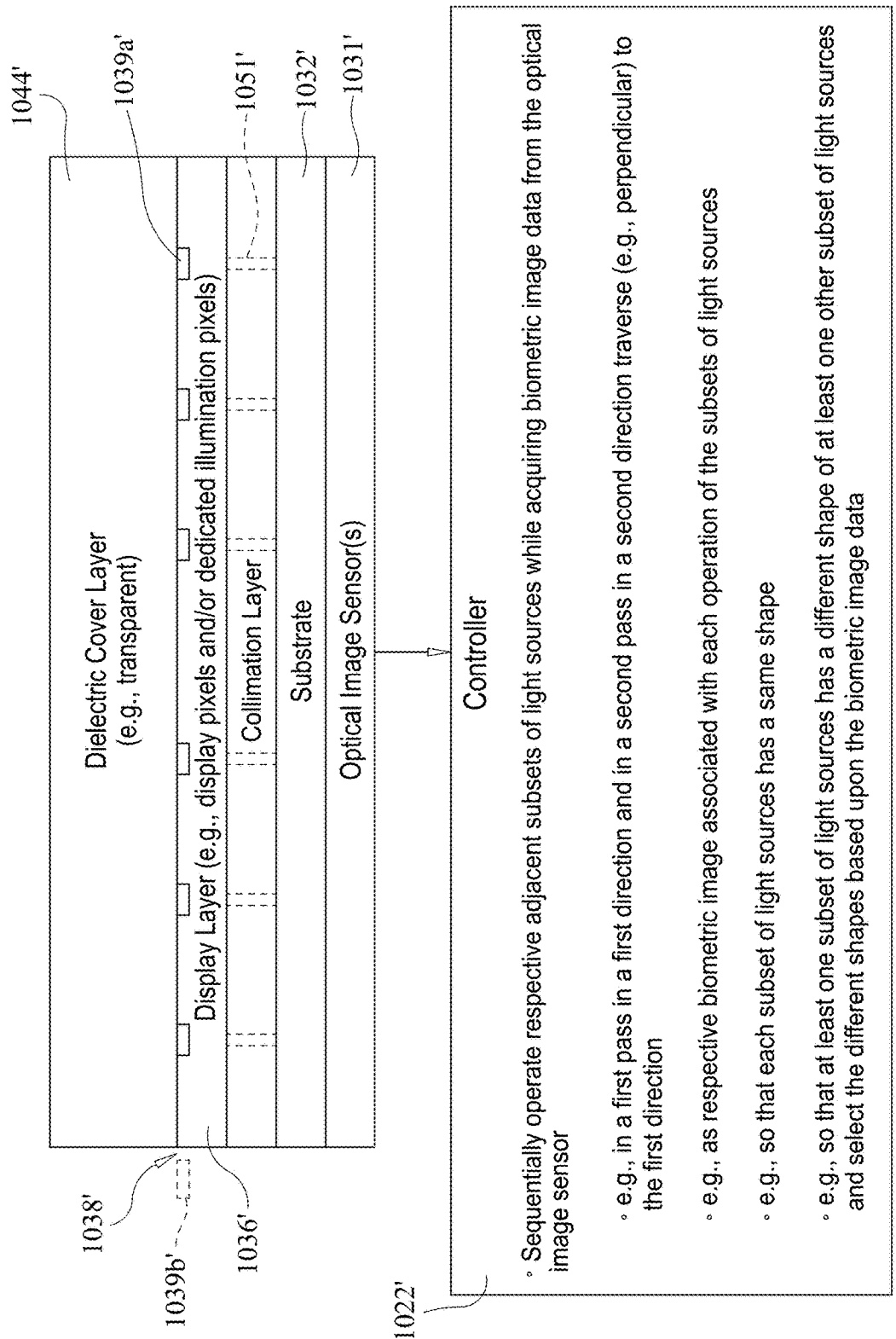
FIG. 9 is a schematic block diagram illustrating part of an electronic device according to another embodiment.
Figure 10:
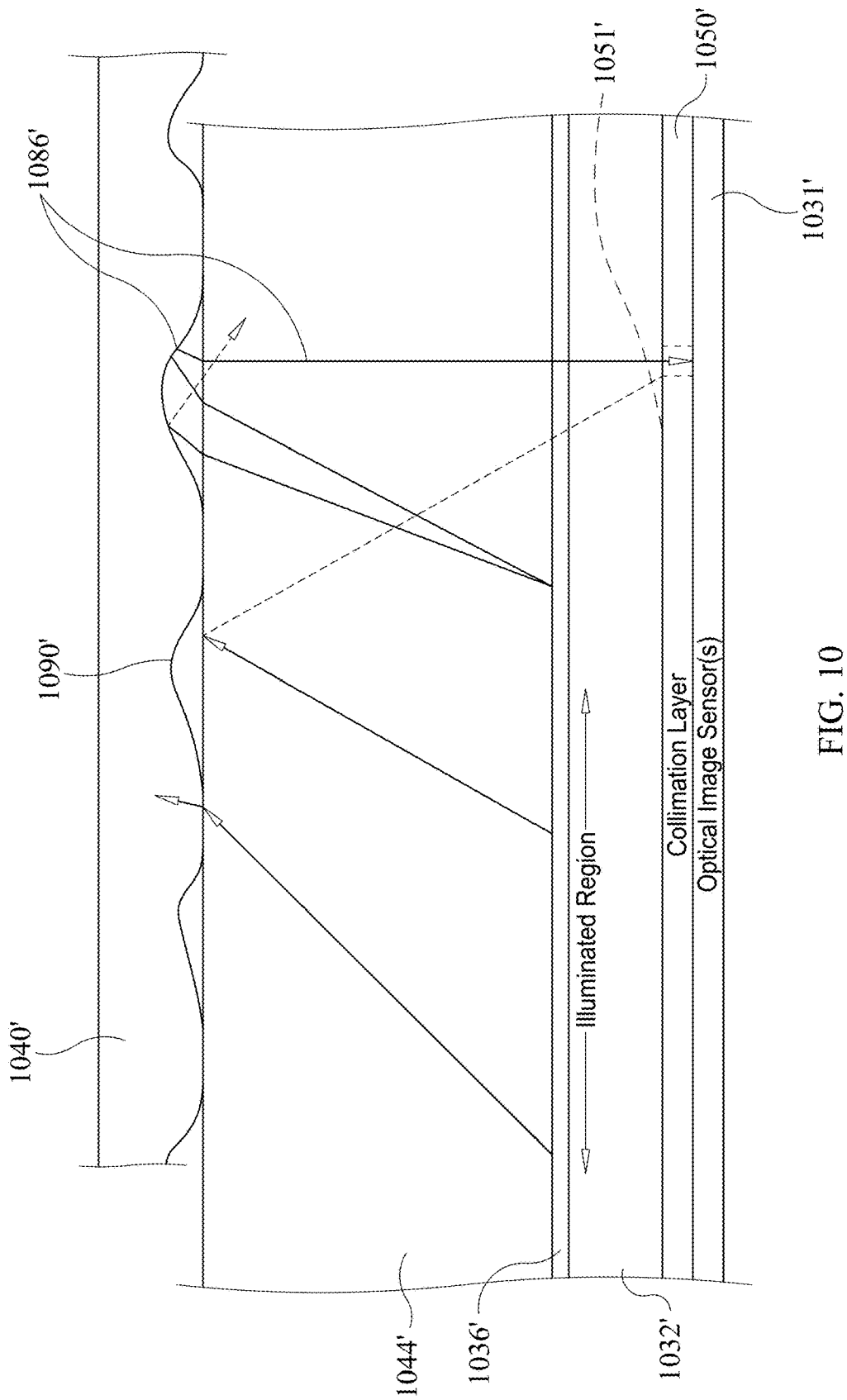
FIG. 10 is a schematic diagram illustrating acquisition of biometric image data according to the embodiment in FIG. 9.
Figure 11:
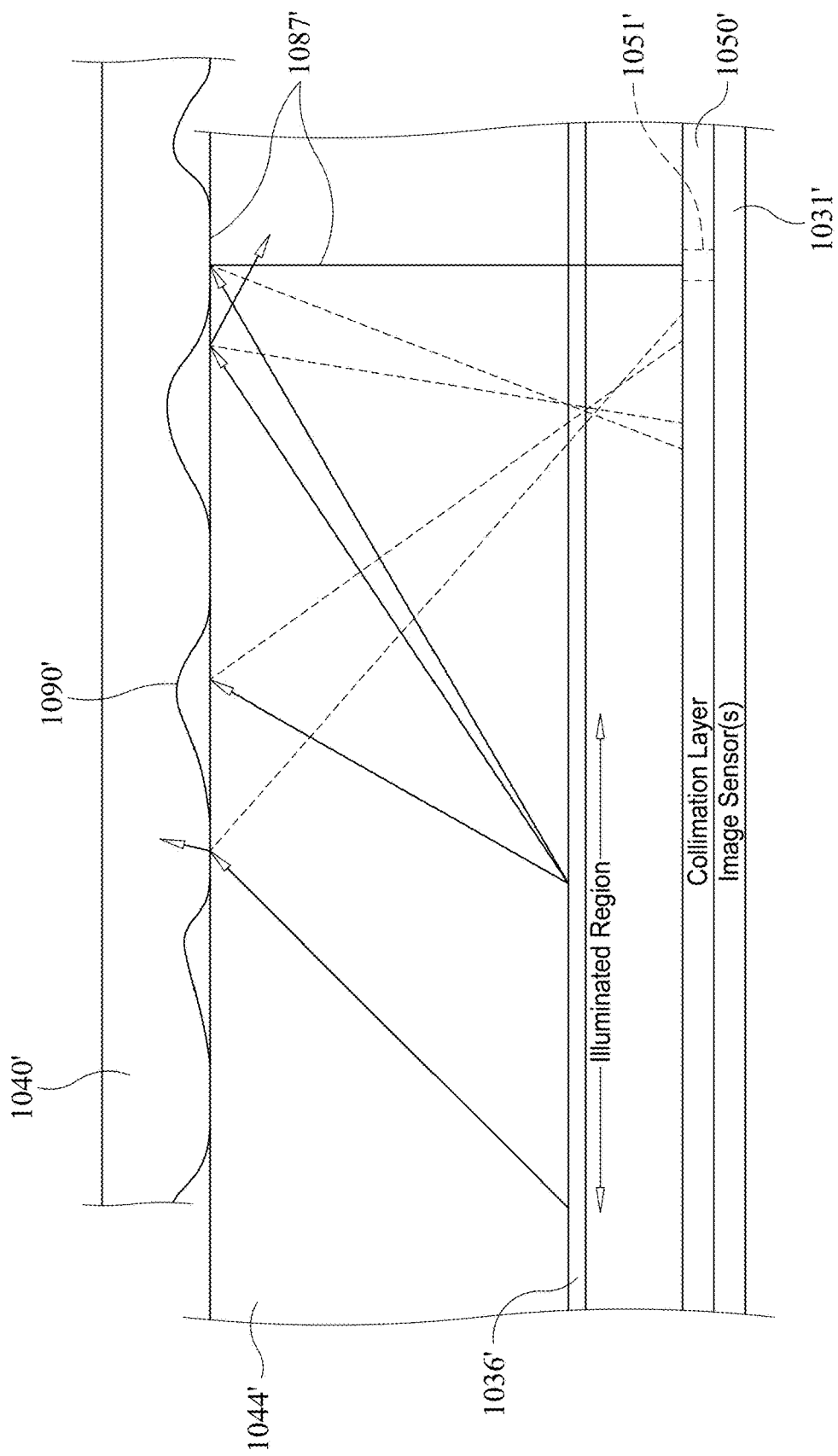
FIG. 11 is another schematic diagram illustrating acquisition of biometric image data according to the embodiment in FIG. 9.

Referring now to FIGS. 9-11, in another embodiment, the optical element may be in the form of a collimation layer 1050'. The collimation layer 1050' has light transmissive collimation openings 1051' therein aligned with the optical image sensor 1031'. It will be appreciated by those skilled in the art that the collimation layer 1050' may be part of or integrated within the optical image sensor 1031', for example, formed within metallization layers of the optical image sensor.

By sequentially operating respective adjacent subsets of light sources 1038' while acquiring biometric image data (i.e., patterned illumination) and using a collimation layer 1050', reflection from valley walls 1086' can be seen if the illumination angle is perpendicular to the ridge flow (FIG. 10), and the diffuse reflection from the ridge top 1087' can be seen if the illumination angle is parallel to the ridge flow (FIG. 11). The area 1090' in FIGS. 10 and 11 corresponds to the cover layer-to-air specular reflection. Similar to the embodiments described above, in the case of the illumination angle being perpendicular to the ridge flow, the valley wall reflection is stronger than the diffuse reflection from the top of the ridge. Thus, the valley walls are brighter in the image. In the case of the illumination angle being parallel to the ridge flow, the diffuse reflection from the ridge top will be brighter, since there is no reflection from the valley walls and the air-to-cover layer reflections are not reflected normal to the collimation layer or collimator (i.e., collimation openings).

Figure 12:
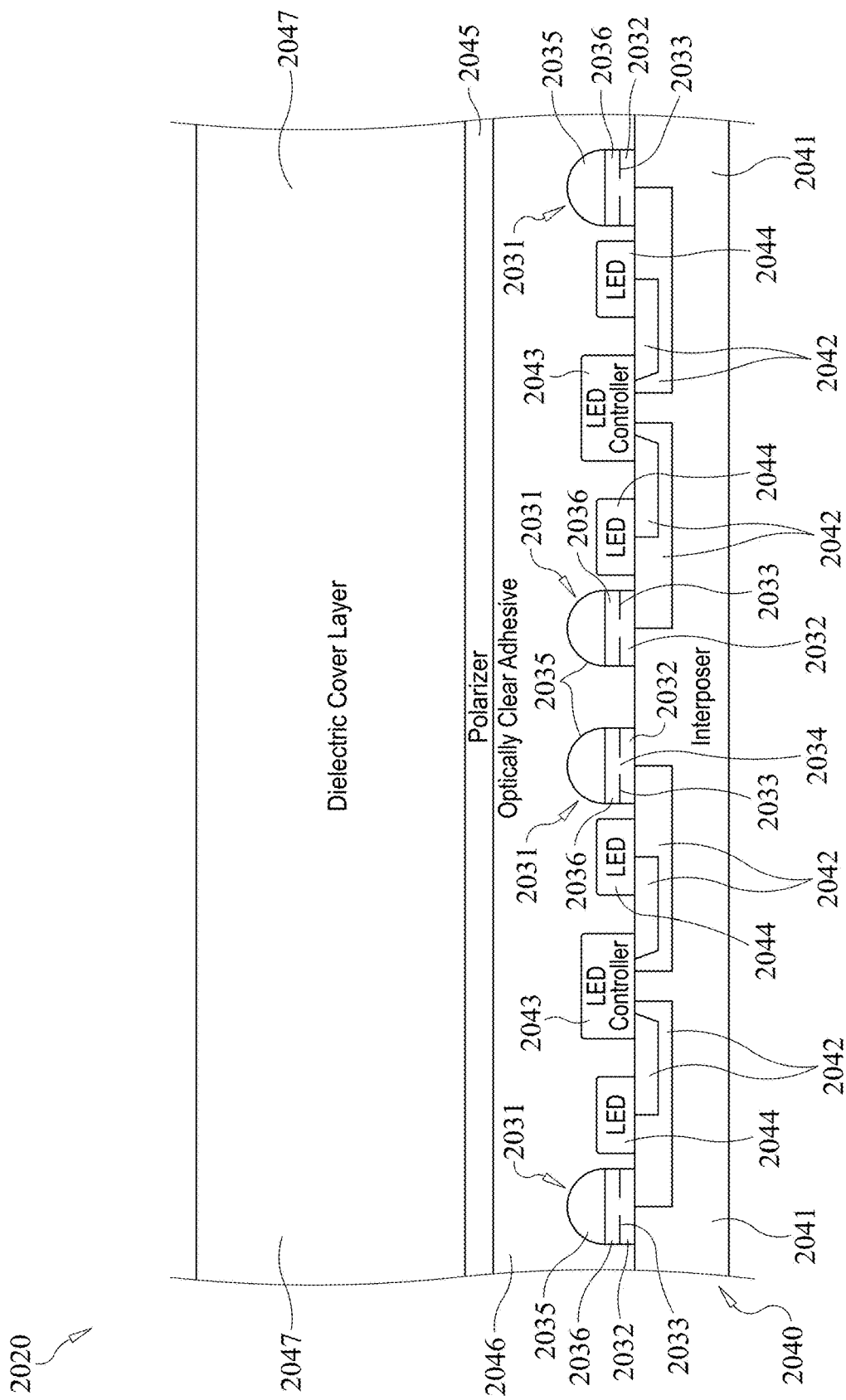
FIG. 12 is a schematic diagram of a portion of an electronic device in accordance with another embodiment.
Figure 13:
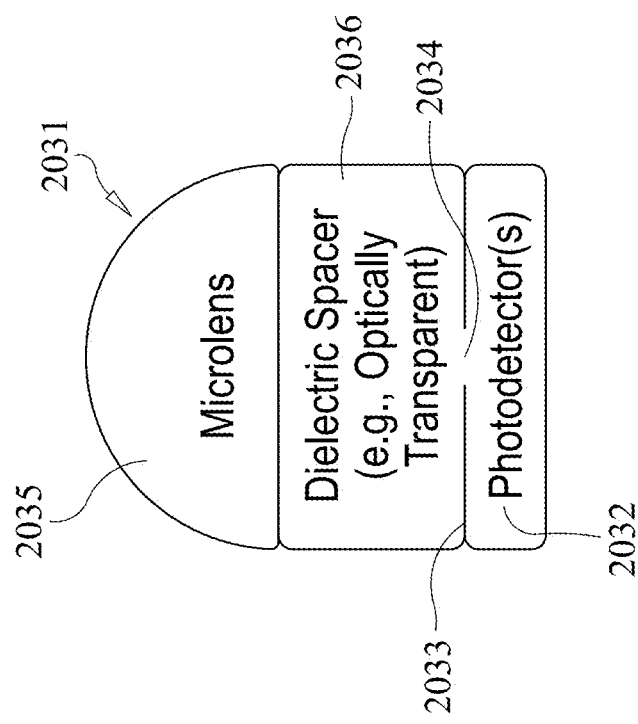
FIG. 13 is an enlarged schematic diagram of the optical image sensor of FIG. 12.

Various arrangements of the optical image sensor, light sources and optical element for use with the controller 1022 will now be described. Referring now additionally to FIGS. 12 and 13, the electronic device 2020 may include a substrate 2040. The substrate 2040 may include an interposer layer 2041 and an interconnect layer 2042. Light emitting diode (LED) controller circuitry 2043 may be carried by the interconnect layer 2042.

LEDs 2044 are carried by the interconnect layer 2042 laterally adjacent the LED controller circuitry 2043. The LEDs 2044 direct light to a dielectric cover layer 2047 above the substrate 2040. The dielectric cover layer 2047, which may be optically transparent, defines a finger sensing surface that receives a user's finger 2028 adjacent thereto.

Optical image sensors 2031 are carried by the substrate 2040 below the dielectric cover layer 2047 and laterally adjacent the LEDs 2044 and LED controller circuitry 2043. Each optical image sensor 2031 illustratively includes a photodetector 2032, for example, a photodiode, and a pin-hole mask 2033 above the photodetector. More than one photodetector 2032 may be included in each optical image sensor 2031.

The pin-hole mask 2033 may be an opaque mask that includes at least one opening 2034 or pin-hole therein to permit the passage of light therethrough. The pin-hole mask 2033 may be opaque, and thus does not permit light to pass through. The pin-hole mask 2033 may include chromium, for example, a layer of chromium, to provide the opacity. Of course, other materials, may be used to provide opacity.

An optical element 2035, illustratively in the form of a microlens, is above the pin-hole mask 2033 and cooperates therewith to collimate light reflected from the dielectric cover layer 2047 to the photodetector 2032. The microlens 2035 may have a thickness of about 1 micron, for example. An optically transparent dielectric spacer 2036 is between the microlens 2035 and the pin-hole mask 2033.

An optically clear adhesive 2046 may be between the optical image sensors 2031 and the LEDs 2044. A polarizer layer 2045 is carried below the dielectric cover layer 2047, and more particularly, between the dielectric cover layer and the optical images sensors 2031 (i.e., above the optically clear adhesive 2046). Of course, other and/or additional layers may be included. The substrate 2040, the dielectric cover layer 2047, the LEDs 2044, the optical image sensors 2031, and the associated layers and components described above may be integrated into the display 2023. For example, the components described above may be part of the display.

Figure 14:
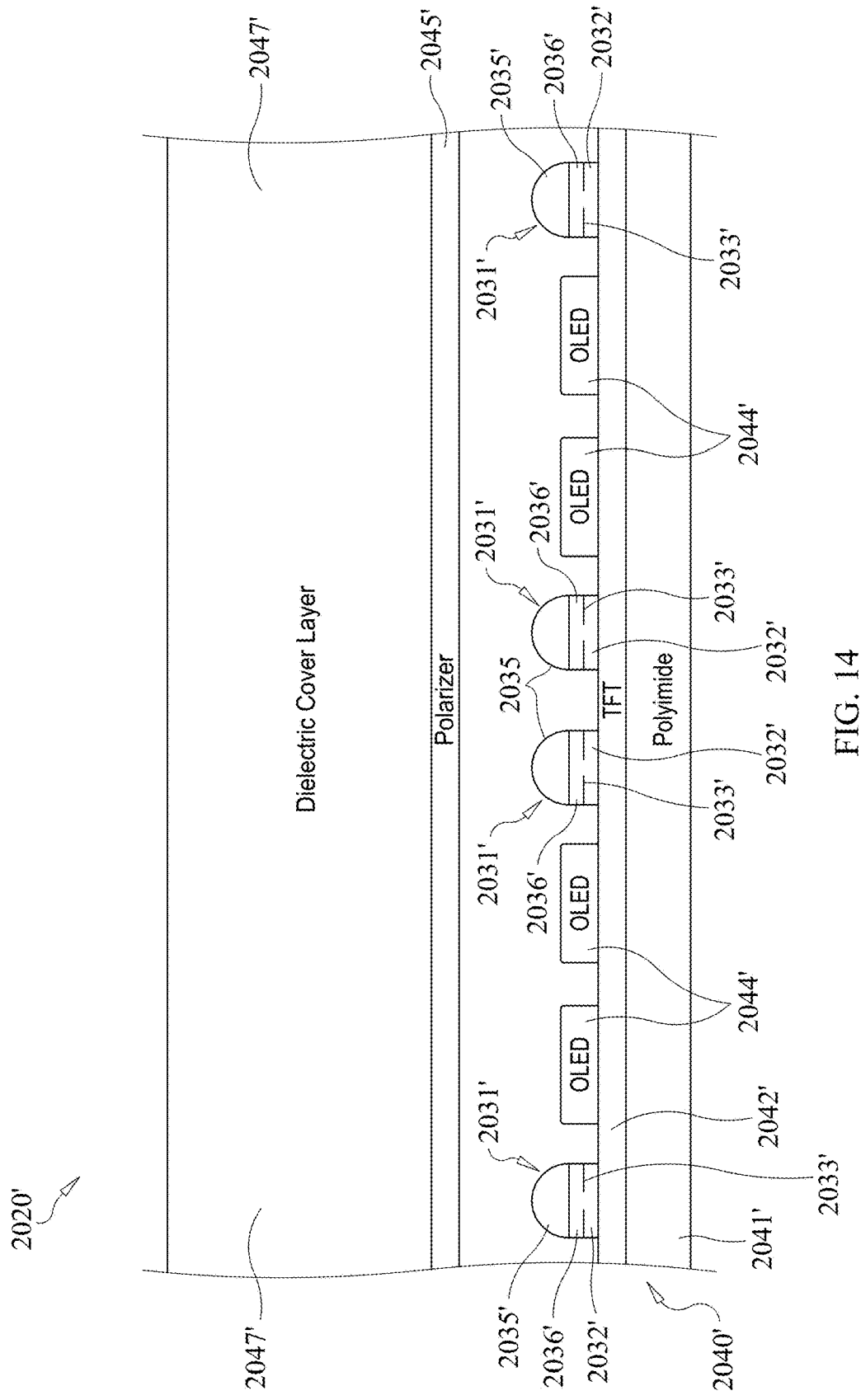
FIG. 14 is a detailed schematic diagram of a portion of an electronic device in accordance with another embodiment.
Figure 15:
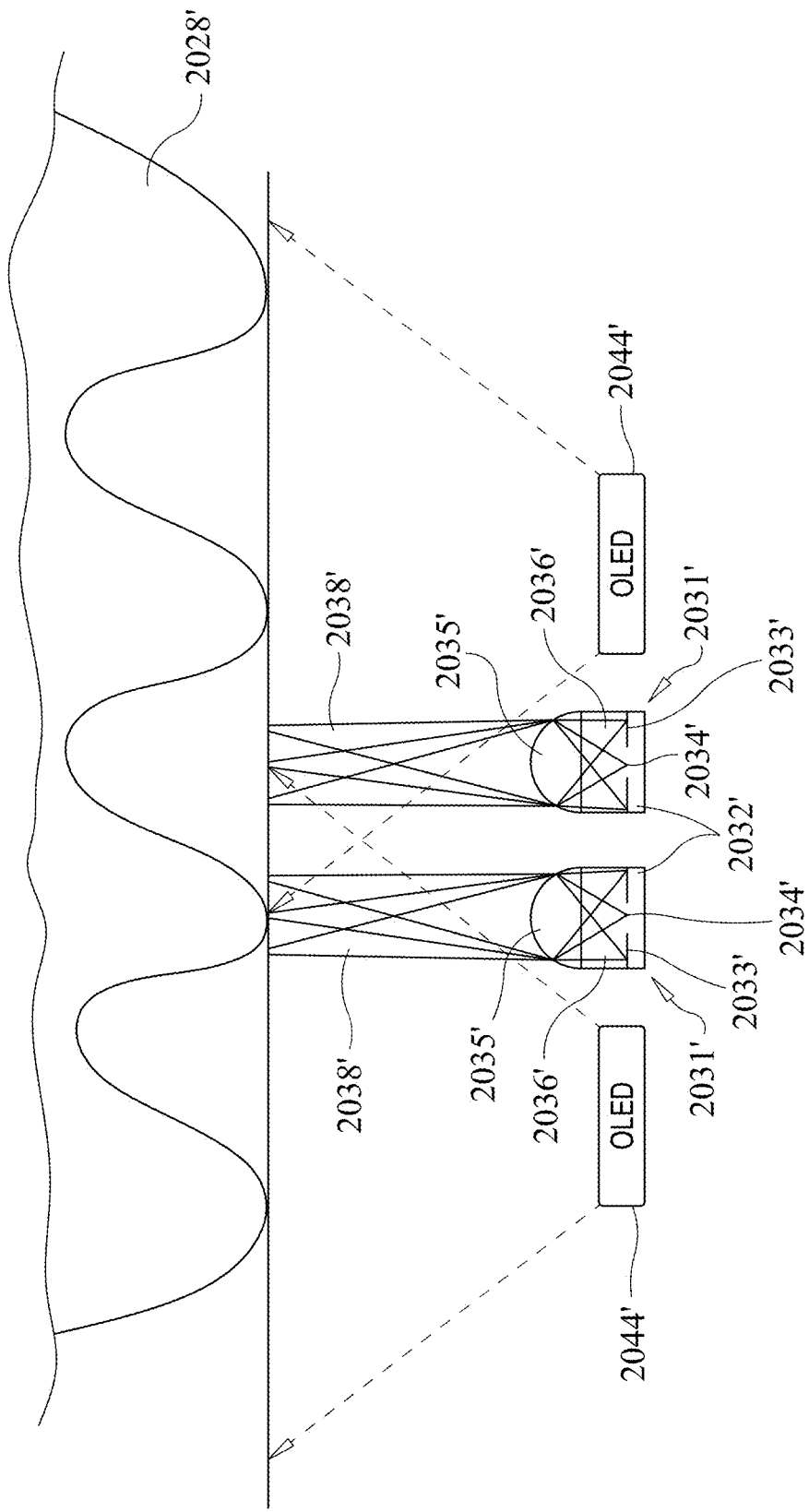
FIG. 15 is a diagram illustrating sensed field of view of the optical image sensor of FIG. 14.

Referring now to FIGS. 14 and 15, in another embodiment, the substrate 2040' may include a polyimide layer 2041' and a thin-film transistor (TFT) layer 2042' above the polyimide layer. Organic LEDs (OLEDs) 2044' are carried by the substrate 2040' and more particularly, carried by the TFT layer 2042'. The TFT layer 2042' may have a height of about 2-3 microns, for example.

As will be appreciated by those skilled in the art and with reference to the embodiments described above, the field of view 2038' for each photodetector is limited to a relatively narrow angle by using the microlens 2035' and the pin-hole mask 2033' (regardless of the type of substrate). This may advantageously permit collimation of the field of view 2038' such that each photodetector 2032' is imaging the information or reflected light from on top of itself.

In some embodiments, as stackable organic layers, the OLEDs 2044' may be operated as photodetectors. In other words, the OLEDs 2044' may be used to direct light to the dielectric cover layer 2047' and also to sense an optical image. However, in this embodiment, it may be desirable to not use a microlens or pin-hole mask, but instead the deblurring circuitry.

Figure 16:
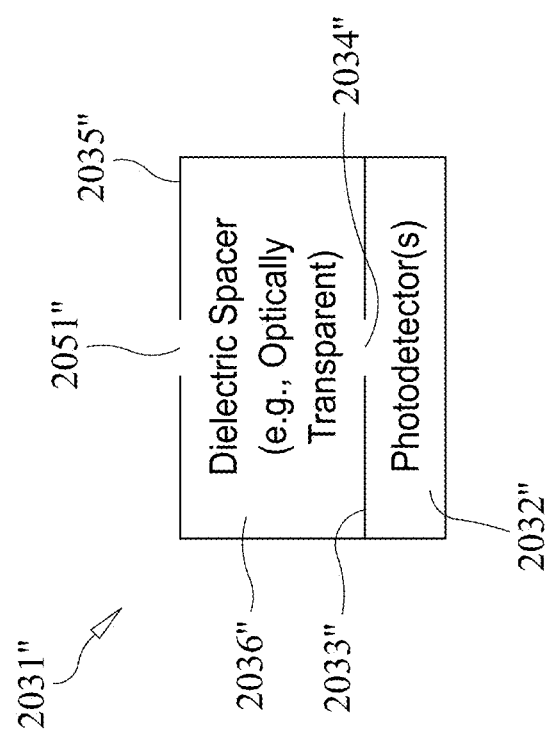
FIG. 16 is an enlarged schematic diagram of an optical image sensor in accordance with an embodiment.
Figure 17:
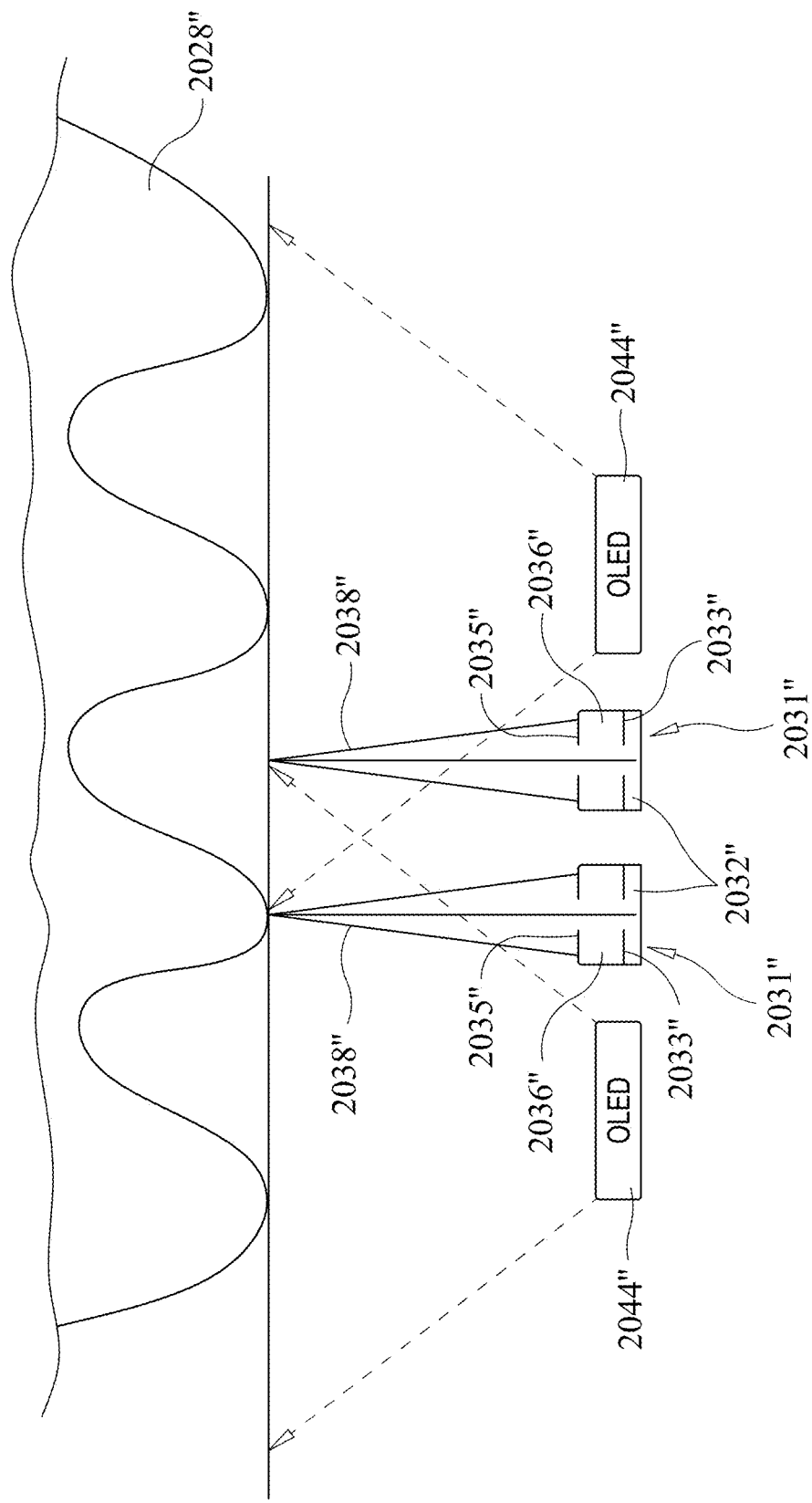
FIG. 17 is a diagram illustrating sensed field of view of the optical image sensor of FIG. 16.

Referring now to FIGS. 16 and 17, in another embodiment the optical element 2035" may be in the form of a second pin-hole mask having an opening 2051" therein. In other words, instead of a microlens, each optical sensor 2031" includes a first pin-hole mask 2033" above the photodetector 2032" and a second pin-hole mask 2035" above the first pin-hole mask and spaced from the first pin-hole mask by a dielectric spacer 2036". The first and second pin-hole masks 2033", 2035" may be embodied as metal layers to limit the field of view 1038". Of course, more than two pin-hole masks (e.g., metal layers) may be used to achieve desired limiting of the field of view 2038".

Referring briefly to FIG. 18, in another embodiment, a mesh grid 2039'" defining the pin-hole mask may be carried above the photodetectors 2032'". The mesh grid 2039'" may permit implementation of smaller or multiple pin-holes 2034'" per photodetector or photodiode 2032'".

The arrangement of the optical image sensors 2031 and the LEDs 2044 may be particularly advantageous for multiple applications, for example, fingerprint sensing, optical touch sensing, and/or heart rate sensing (e.g., if the LEDs are infrared (IR), near infrared (NIR), and/or ambient light sensing (ALS). Additionally, the IR-cut filter can be below or on top of the optically transparent dielectric spacer 2036 to permit fingerprint sensing below direct sunlight, for example.

A method aspect is directed to a method of acquiring biometric image data in an electronic device 1020 that includes a dielectric cover layer 1044, at least one optical image sensor 1035, at least one optical element 1050 associated with the at least one optical image sensor, and a plurality of light sources 1038 below the dielectric cover layer and selectively operable in subsets of light sources. The method includes using a controller 1022 to sequentially operate respective adjacent subsets of light sources 1037*a*-1037*e* while acquiring the biometric image data from the optical image sensor 1031.

While a controller 1022 is described herein, it should be noted that the controller performing the functions described herein may be embodied as a single integrated circuit (IC) or multiple integrated circuits. In other words, while a controller 1022 has been described, it will be appreciated that certain respective functionality may be performed by physically separate circuits.

The benefits of biometric data collected by a device as disclosed herein include convenient access to device features without the use of passwords. In other examples, user biometric data is collected for providing users with feedback about their health or fitness levels. The present disclosure further contemplates other uses for personal information data, including biometric data, that benefit the user of such a device.

Practicing the present invention requires that collecting, transferring, storing, or analyzing user data, including personal information, will comply with established privacy policies and practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. Personal information from users should not be shared or sold outside of legitimate and reasonable uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

The present disclosure also contemplates the selective blocking of access to, or use of, personal information data, including biometric data. Hardware and/or software elements disclosed herein can be configured to prevent or block access to such personal information data. Optionally allowing users to bypass biometric authentication steps by providing secure information such as passwords, personal identification numbers (PINS), touch gestures, or other authentication methods, alone or in combination, is well known to those of skill in the art. Users can further select to remove, disable, or restrict access to certain health-related applications collecting users' personal health or fitness data.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
a dielectric cover layer defining a finger sensing surface;
at least one optical image sensor below the dielectric cover layer;
at least one optical element associated with the at least one optical image sensor;
a plurality of light sources below the dielectric cover layer and selectively operable in subsets of light sources; and
a controller configured to sequentially operate the subsets of light sources in a first pass in a first direction, and in a second pass in a second direction transverse to the first direction while acquiring biometric image data from the at least one optical image sensor.

2. The electronic device of claim 1 wherein the at least one optical element comprises at least one pin-hole mask.

3. The electronic device of claim 1 wherein the at least one optical element comprises at least one microlens.

4. The electronic device of claim 1 wherein the plurality of light sources comprises a plurality of dedicated illumination pixels.

5. The electronic device of claim 1 wherein the plurality of light sources comprises a plurality of display pixels.

6. The electronic device of claim 5 wherein the first and second directions are perpendicular.

7. The electronic device of claim 1 wherein the controller is configured to acquire the biometric image data as a respective biometric image associated with each operation of the subsets of light sources.

8. The electronic device of claim 1 wherein the controller is configured to sequentially operate respective adjacent subsets of light sources so that each subset of light sources has a same shape.

9. The electronic device of claim 1 wherein the controller is configured to sequentially operate respective adjacent subsets of light sources so that at least one subset of light sources has a different shape than a shape of at least one other subset of light sources.

10. The electronic device of claim 9 wherein the controller is configured to select the different shapes based upon the biometric image data.

11. The electronic device of claim 1 wherein the plurality of light sources comprises a plurality of light emitting diodes (LEDs).

12. An electronic device comprising:
a dielectric cover layer defining a finger sensing surface;
at least one optical image sensor below the dielectric cover layer and configured to sense biometric image data;
at least one optical element associated with the at least one optical image sensor;
a plurality of display pixels below the dielectric cover layer and selectively operable in subsets of display pixels; and
a controller configured to sequentially operate respective adjacent subsets of display pixels in a first pass in a first direction, and in a second pass in a second direction transverse to the first direction while acquiring biometric image data from the optical image sensor.

13. The electronic device of claim 12 wherein the first and second directions are perpendicular.

14. The electronic device of claim 12 wherein the controller is configured to acquire the biometric image data as a respective biometric image associated with each operation of the subsets of display pixels.

15. The electronic device of claim 12 wherein the controller is configured to sequentially operate respective adjacent subsets of display pixels so that each subset of display pixels has a same shape.

16. The electronic device of claim 12 wherein the controller is configured to sequentially operate respective adjacent subsets of display pixels so that at least one subset of display pixels has a different shape than a shape of at least one other subset of display pixels.

17. The electronic device of claim 16 wherein the controller is configured to select the different shapes based upon the biometric image data.

18. A method of acquiring biometric image data in an electronic device comprising a dielectric cover layer defining a finger sensing surface, at least one optical image sensor below the dielectric cover layer, at least one optical element associated with the at least one optical image sensor, a plurality of light sources below the dielectric cover layer and selectively operable in subsets of light sources, the method comprising:
using a controller to sequentially operate respective adjacent subsets of light sources in a first pass in a first direction, and in a second pass in a second direction transverse to the first direction while acquiring the biometric image data from the at least one optical image sensor.

19. The method of claim 18 wherein the controller is used to acquire the biometric image data as a respective biometric image associated with each operation of the subsets of light sources.

20. The method of claim 18 wherein the controller is used to sequentially operate respective adjacent subsets of light sources so that each subset of light sources has a same shape.

21. The method of claim 18 wherein the controller is used to sequentially operate respective adjacent subsets of light sources so that at least one subset of light sources has a different shape than a shape of at least one other subset of light sources.

22. The method of claim 21 wherein the controller is used to select the different shapes based upon the biometric image data.

23. An electronic device comprising:
   a dielectric cover layer defining a finger sensing surface;
   at least one optical image sensor below the dielectric cover layer;
   at least one optical element associated with the at least one optical image sensor;
   a plurality of light sources below the dielectric cover layer and selectively operable in subsets of light sources; and
   a controller configured to sequentially operate respective adjacent subsets of light sources so that at least one subset of light sources has a different shape than a shape of at least one other subset of light sources while acquiring biometric image data from the at least one optical image sensor.

24. The electronic device of claim 23 wherein the at least one optical element comprises at least one pin-hole mask.

25. The electronic device of claim 23 wherein the at least one optical element comprises at least one microlens.

26. The electronic device of claim 23 wherein the plurality of light sources comprises a plurality of dedicated illumination pixels.

27. The electronic device of claim 23 wherein the plurality of light sources comprises a plurality of display pixels.

* * * * *